United States Patent [19]

Ricards

[11] Patent Number: 4,825,532
[45] Date of Patent: May 2, 1989

[54] METHOD FOR MAKING A MULTI-HEAD MAGNETIC HEAD ASSEMBLY

[75] Inventor: John D. Ricards, DelMar, Calif.

[73] Assignee: Eastman Kodak Company, Rochester, N.Y.

[21] Appl. No.: 180,871

[22] Filed: Apr. 13, 1988

[51] Int. Cl.$^4$ .............................................. G11B 5/42
[52] U.S. Cl. ..................................... 29/603; 360/122; 360/129
[58] Field of Search ................. 29/603; 360/129, 122, 360/125-127

[56] References Cited

U.S. PATENT DOCUMENTS

| | | |
|---|---|---|
| 3,390,451 | 7/1968 | Peloschek . |
| 3,400,386 | 9/1968 | Sinnott . |
| 3,460,244 | 8/1969 | Metz ....................................... 29/603 |
| 3,466,637 | 8/1969 | Hagadorn . |
| 3,521,006 | 7/1970 | Michael .............................. 360/129 |
| 3,543,396 | 12/1970 | Illg et al. . |
| 3,544,982 | 12/1970 | Hanak . |
| 3,668,775 | 6/1972 | Morita et al. . |
| 3,761,641 | 9/1973 | Mlinaric . |
| 3,789,505 | 2/1974 | Huntt . |
| 3,842,494 | 10/1974 | Chiba et al. . |
| 3,909,932 | 10/1975 | Kroon . |
| 4,160,315 | 7/1979 | Tandon et al. ......................... 29/603 |

OTHER PUBLICATIONS

"Magnetic Tape Recording Technical Fundamentals", 4th printing revised, 1984, pp. 23-25.
"The Complete Handbook of Magnetic Recording", by Jorgensen, 1980 ed., pub. by TAB Book, Inc., Blue Ridge Sumit, PA, pp. 158-166.

Primary Examiner—Carl E. Hall
Attorney, Agent, or Firm—William F. Noval

[57] ABSTRACT

A method including the following steps: (1) providing a single piece magnetic ferrite faceplate which has a face region and which has at least two aligned slots which open on the face region and extend into the faceplate; (2) providing a multihead magnetic ferrite "breadslice" core structure which includes an elongated base portion connecting at least two in-line magnetic heads which extend from the base portion; (3) bonding the magnetic ferrite breadslice core structure to the faceplate so that the magnetic heads extend into the slots; and (4) removing the base portion from the breadslice core structure so that individual magnetic heads remain bonded in their respective slots in the faceplate.

4 Claims, 8 Drawing Sheets

METHOD FOR MAKING A MULTI-HEAD MAGNETIC HEAD ASSEMBLY

BACKGROUND OF THE INVENTION

This invention relates in general to a method for making a magnetic head assembly. More particularly, this invention relates to an improved method for making a multi-head magnetic head assembly for use in high density magnetic storage devices.

Magnetic head assemblies used in magnetic tape recorders and magnetic disc drives must meet more demanding design specifications necessitated by higher density recording formats. Thus, in a high density magnetic tape recorder, the tape bearing surfaces (such as magnetic heads and non-magnetic faceplate surfaces) must be durable in order to provide long head life despite high pressure contact over the head gap area with highly abrasive magnetic tape media (such as chromium dioxide tape). The faceplate and heads should have compatible wear properties to prevent head undercut and separation loss. Moreover, the magnetic head assembly must have mechanical stability and be able to withstand environmental changes (temperature, humidity, shock and vibration) without performance degradation. The magnetic head core structure must be shielded to minimize crosstalk between heads in adjacent tracks and heads in the same track. The magnetic head assembly should also have a cost effective design in order to be competitive in a highly cost sensitive market.

Numerous proposals have been made to utilize both magnetic and non-magnetic ferrite in magnetic head assembly design. High density ferrites are generally mechanically stable and highly resistant to abrasion and provide good signal recording and reproduction characteristics. Typically, a multi-channel magnetic head assembly has been formed from a large number of individual elements. A typical head assembly, which is made of two half brackets or two half sheils screwed and/or epoxied together, would include individual ferrite or metal cores wound with the necessary turns of electrical conductor. The cores are loaded into half brackets, cemented in place and connected to electrical terminal boards or electrical connector plates inserted into the bottom of the half brackets. Tip plates which form the front surface of the magnetic head assembly are slotted to accommodate individual intertrack magnetic shields. The tip plates are are grooved to receive magnetic head tip pieces which are especially hard and durable. The tip plates are then attached to the core loaded half brackets to provide intimate contact between the tip pieces and the ferrite cores. The magnetic gap of each head is formed by vacuum deposition of silicon monoxide and the two half brackets bonded together. The front surface contacting the tape is then contoured (see for example, the Bell & Howell publication entitled "MAGNETIC TAPE RECORDING TECHNICAL FUNDAMENTALS", 4th printing revised, 1984, pp. 23 et. seq.; "THE COMPLETE HANDBOOK OF MAGNETIC RECORDING", by Jorgensen, 1980 ed., pub. by TAB Books, Inc., Blue Ridge Summit, PA pp. 158 et seq.; and U.S. Pat. No. 3,400,386, entitled "Multichannel Magnetic Head Assembly", issued Sept. 3, 1968, by R. C. Sinott). Such magnetic head assemblies are disadvantageous because of the difficulty and expense in producing them. Moreover a large number of assemblies must be discarded as unusable due to incorrect component positioning.

Multichannel magnetic head assemblies have also been proposed in which a plurality of magnetic ferrite heads are bonded to a split non-magnetic ferrite faceplate. Individual magnetic shields are then secured between adjacent heads to minimize crosstalk and the resultant structure mounted in an aluminum shell (see for example, U.S. Pat. No. 3,668,775, issued June 13, 1972, entitled "Method for Manufacturing Magnetic Heads", by Martai et al; and U.S. Pat. No. 3,789,505, issued Feb. 5, 1974, entitled "Method Of Making a Multi-Core Magnetic Head With A Non-Magnetic Holder", by R. L. Hunt). Such magnetic head assemblies are disadvantageous in the use of individual magnetic shields between adjacent heads and in the use of different ferrite materials in the faceplate structure which may produce mechanical instabilities.

Magnetic head assemblies are also known in which magnetic ferrite cores are mounted in non-magnetic ferrite holders and individual magnetic ferrite shields are inserted between adjacent magnetic heads (see for example, U.S. Pat. No. 3,909,932, issued Oct. 7, 1975, entitled "Method of Manufacturing A Multi-Track Magnetic Head", by W. L. Kroon; U.S. Pat. No. 3,842,494, issued Oct. 22, 1974, entitled "Multi-Channel Magnetic Ferrite Head And A Method For Making The Same", by H. Shiba et al; and U.S. Pat. No. 3,761,641 issued Sept. 25, 1973, entitled "Magnetic Head With Demountable Face Part Assembly", by T. A. Milnarick). Each of the magnetic head assemblies disclosed in these patents is disadvantageous because of the large number of parts required to form the magnetic head assembly and because of the difficulty in properly aligning the magnetic head gaps across the width of the assembly. Such magnetic head assemblies are complex and expensive to produce.

In order to reduce the number of individual parts used in a multi-head magnetic head assembly and in order to effect exact alignment of gaps across the width of the head assembly, it has been proposed to form several aligned heads from blocks of magnetic ferrite material which are ground down to form individual magnetic head core elements. This structure is then lapped, gapped and bonded to form a multi-head magnetic assembly. The individual heads may be commonly joined together by a portion of a magnetic ferrite block which has not been removed. Such an assembly is disclosed in U.S. Pat. No. 3,544,982, issued Dec. 1, 1970, entitled "Multi-Head Magnetic Assembly", by J. J. Hanak in which the back portion of the magnetic heads is commonly joined by magnetic ferrite which is integral with the individual head cores. U.S. Pat. No. 3,543,396, issued Dec. 1, 1970 entitled "Method Of Multi-Track, Two-Gap, Ferrite Magnetic Heads Design Especially For Digital Recording", by Z. Illg et al., discloses a magnetic head assembly in which three blocks of magnetic ferrite material are lapped, gapped and bonded together to form a unitary structure. This structure is ground down to provide a multi-track magnetic head assembly in which each track has a pair of heads. In the embodiments shown in FIGS. 6 and 7 of the latter patent, a centrally disposed solid magnetic ferrite piece runs the width of the head assembly and is integral with the inner core leg of each head in the assembly. The magnetic head assemblies disclosed in these two patents are disadvantageous because separate magnetic shields must be provided between individual magnetic heads. Moreover, where magnetic ferrite is integral to several magnetic heads, shunting of the magnetic field to adjacent heads increases the likelihood of signal degrading crosstalk.

SUMMARY OF THE INVENTION

According to the present invention, there is provided a new and improved method for making a multi-head, magnetic head assembly which satisfies exacting specifications for high density magnetic recording devices. The method is cost-effective and relatively uncomplicated. The method of the invention provides a magnetic head assembly with precisely aligned magnetic head cores which meet severe gap alignment and azimuth specifications. The method according to the invention satisfies difficult magnetic core positioning specifications, such as gap azimuth to a head mounting datum or plane, magnetic head gap depth, magnetic head gap to gap spacing and magnetic head core location to the mounting surface of the magnetic head assembly.

According to a feature of the invention, a multi-head magnetic head core structure referred to as a "breadslice" is formed from parallel, lapped magnetic ferrite bars. The bars are contoured, sputtered with gap material and then bonded together to form a unitary structure. Individual breadslices are then sliced from the unitary bonded structure. Each breadslice includes an elongated base portion connecting at least two in-line magnetic heads extending from the base portion. According to another feature of the present invention, a series of precisely dimensioned, slots are formed in a single piece faceplate of magnetic ferrite and individual breadslice core structures are bonded to the faceplate with magnetic heads extending into the slots. The base portions of the breadslice structures are removed so that individual magnetic heads remain bonded in their respective slots in the faceplate. Thus, each head is effectively shielded from external magnetic fields by the magnetic ferrite faceplate.

BRIEF DESCRIPTION OF THE DRAWNGS

In the detailed description of the preferred embodiment of the invention presented below, reference is made to the accompanying drawings in which like elements are numbered with like numbers.

FIG. 11A, 11B, 12A, 12B, and 12C are sketches illustrating the making of breadslice magnetic head core structures having a three head structure.

DESCRIPTION OF THE PREFERRED EMBODIMENT

Figure 1:
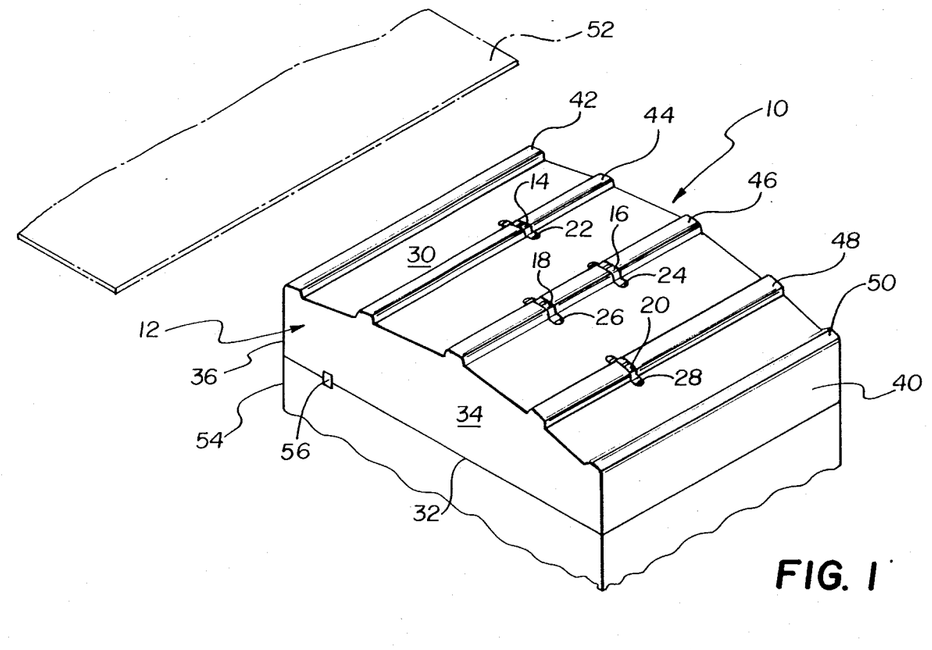
FIG. 1 is a perspective view of a multi-head magnetic head assembly made by the method of the present invention.

Referring now to FIG. 1, there is shown an exemplary multi-head magnetic head assembly which is made according to an embodiment of the method of the present invention. (Reference is made to copending U.S. Patent Application Ser. No. 181,130 entitled "Multihead Magnetic Head Assembly Having A Single Piece Faceplate Of Magnetic Ferrite, for further details of such a magnetic head assembly.) The magnetic head assembly is to be used in a magnetic tape recorder. As shown, magnetic head assembly 10 includes a magnetic ferrite faceplate 12 having four magnetic ferrite magnetic heads 14, 16, 18 and 20 respectively bonded in slots 22, 24, 26, and 28 of faceplate 12. Heads 14 and 16 are aligned in one track and heads 18 and 20 are aligned in another track parallel thereto. Faceplate 12 includes a bottom face 32, sides 34, 36, 38 and 40 and an upper, generally curved face 30. Face 30 interfaces with magnetic tape 52 and includes tape bearing rails 42, 44, 46, 48 and 50. The head gap tip of head 14 is flush with rail 44. The head gap tips of heads 16 and 18 are flush with rail 46 and the head gap tip of head 20 is flush with rail 48.

Faceplate 12 is joined to an aluminum housing 54 and electrically grounded thereto by conductor 56.

Figure 2:
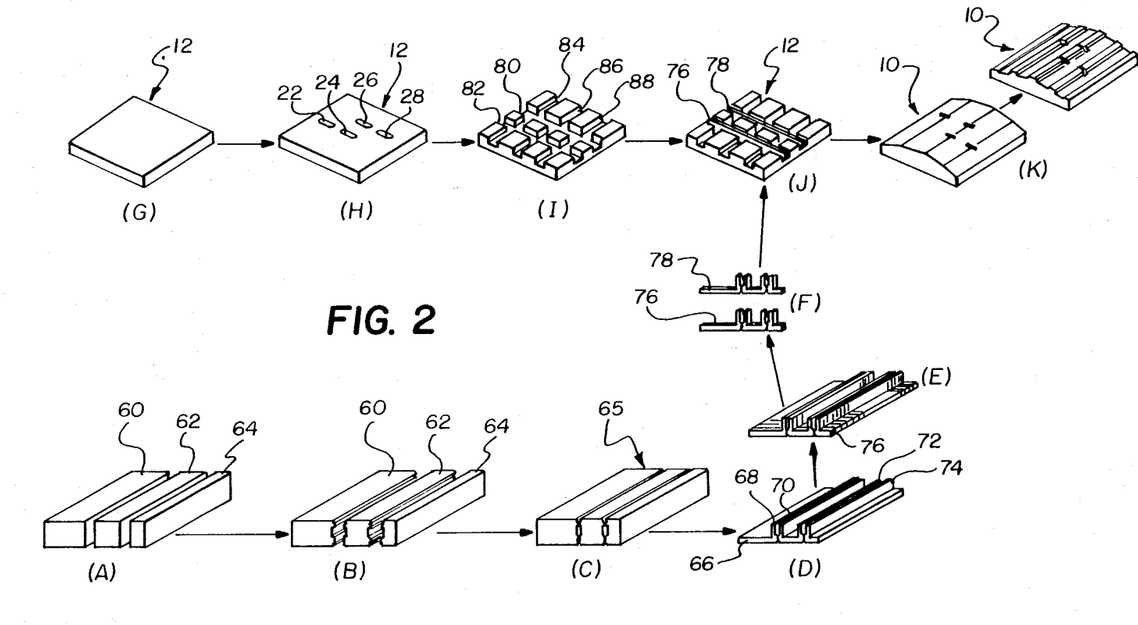
FIG. 2 is a perspective view illustrating the steps in a preferred embodiment of the method of making a magnetic head assembly according to the present invention.

Referring now to FIG. 2, there is shown a diagrammatic perspective view of a preferred embodiment of the method according to the present invention, for making a multi-head magnetic head assembly such as shown in FIG. 1. As shown, at step A, three magnetic ferrite bars 60, 62 and 64 are formed to predetermined dimensions. At step B, the opposing faces of bars 60, 62 and 64 are contoured to produce bonding slots and magnetic gap surfaces which are lapped to a high degree of parallelity and then sputtered with magnetic gap material, such as glass. At step C, bars 60, 62 and 64 are bonded together with bonding material such as glass into a unified structure 65. At step D, structure 65 is ground away to form an elongated base portion 66 from which extend parallel walls 68 and 70 and 72 and 74. In step E, the ground structure of step D is sliced into a plurality of magnetic ferrite "breadslice" core structures such as breadslices 76 and 78 (step F).

At step G, a magnetic ferrite faceplate blank is formed to predetermined peripheral dimensions of the finished faceplate assembly. At step H, a plurality of slots 22, 24, 26 and 28 are formed in faceplate 12. Slots 22-28 extend through the thickness of faceplate 12 and are dimensioned to receive individual magnetic heads. At step I, there is formed in face 30 of faceplate 12 longitudinal slots 80 and 82 and transverse slots 84, 86 and 88.

At step J, breadslices 76 and 78 are combined with and bonded to slotted faceplate 12.

At step K, the face 30 of faceplate 12 and the magnetic head tips are ground down to a preliminary contour.

At step L, the final contour of face 30 of magnetic head assembly 10 is formed.

Figure 3:
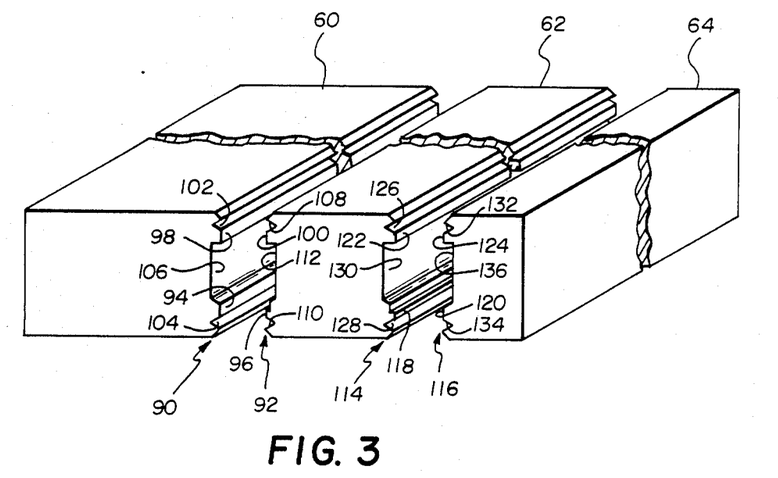
FIGS. 3-7 are perspective views illustrating the steps in making a "breadslice" magnetic head core structure according to the embodiment shown in FIG. 2.

Referring now to FIGS. 3-7, there is shown in greater detail, the steps in forming magnetic head breadslice structures according to the method of the present invention (as shown at steps A-F in FIG. 2). As shown in FIG. 3, the breadslice structures are formed from magnetic ferrite bars 60, 62 and 64. Opposing faces 90 and 92 respectively of bars 60 and 62 are contoured to produce head gap surfaces 94 and 96 and surfaces 98 and 100, surfaces 94, 96 and 98, 100 are lapped to a high degree of parallelity. Face 90 is also contoured to include slots 102 and 104 and recess 106. Face 92 is contoured to include slots 108 and 110 and recess 112. Similarly, faces 114 of bar 62 and 116 of bar 64 are contoured to provide respective head gap surfaces 118 and 120, which are lapped to a high degree of parallelity. Opposing surfaces 122 and 124 respectively on faces 114 and 116 are also lapped to a high degree of parallelity. Face 114 is also contoured to include slots 126 and 128 and recess 130. Face 116 is contoured to include slots 132 and 134 and recess 136.

Figure 4:
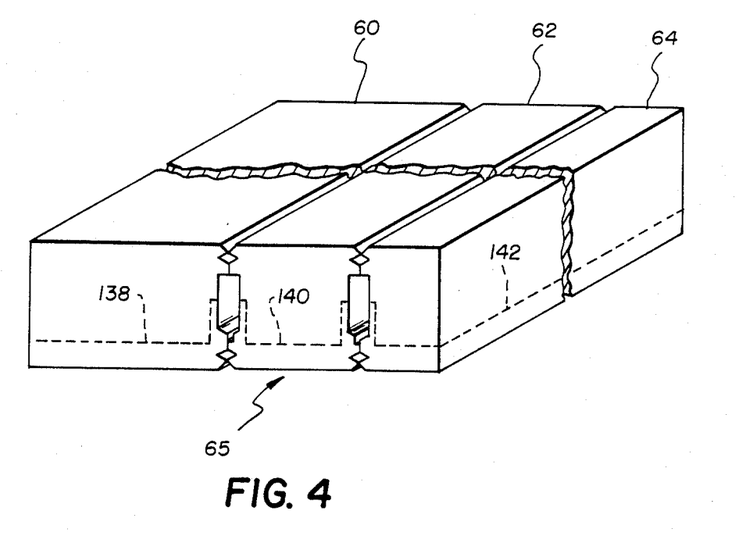

Gap surfaces 94, 96, 118, and 120 are sputtered with gap material such as glass to the desired magnetic head gap length. As shown in FIG. 4, ferrite blocks 60, 62 and 64 are bonded together to form a unitary structure 65. This is effected by assembling bars 60, 62 and 64 and melting glass into the channels formed by opposing slots 102, 108; 104, 110; 126, 132; 128, 134; and the apex formed above gap surfaces 94, 96 and 118, 120.

Figures 5, 6:
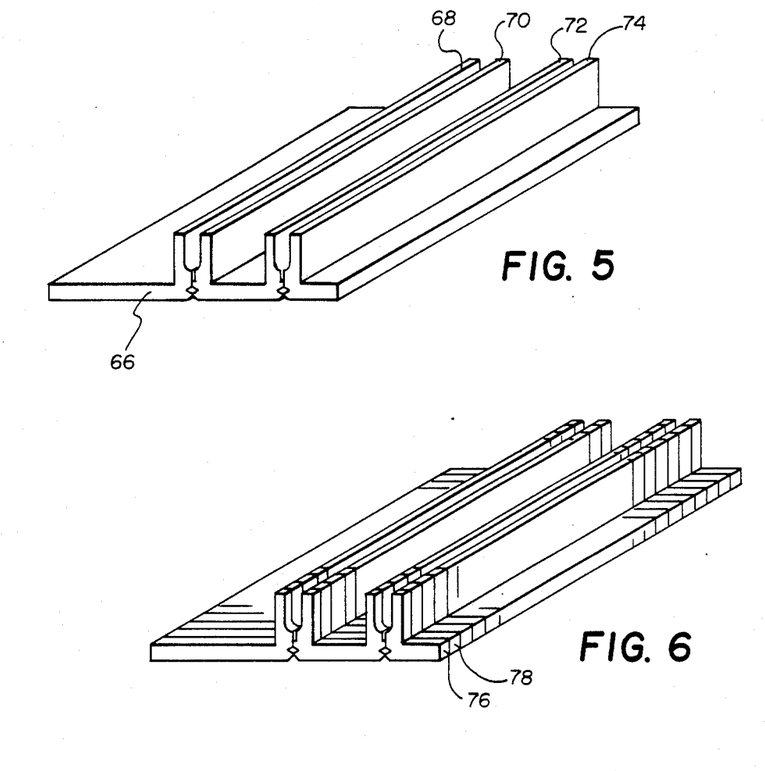

The breadslice composite structure of FIG. 5 is formed by removing (by grinding or the like) from structure 65 all of the magnetic ferrite which is located above the dashed lines 138, 140 and 142 (FIG. 4).

The breadslice composite structure of FIG. 5 includes a flat base portion 66 and spaced walls 68, 70, 72 and 74 which extend substantially perpendicular to base member 66.

Figure 7:
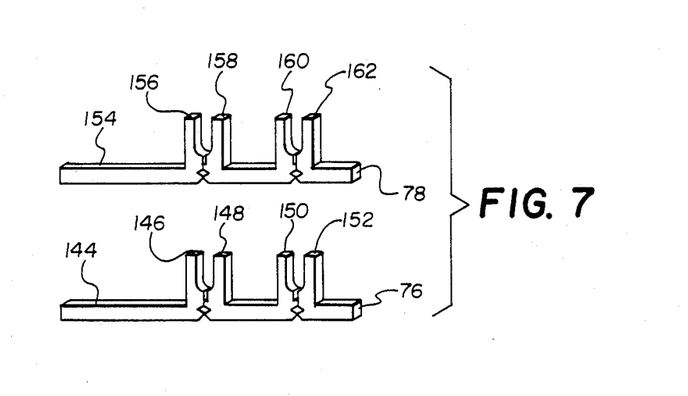
Figure 8A:
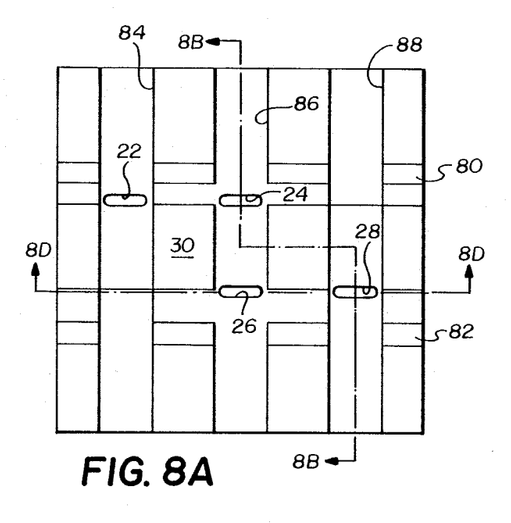
FIGS. 8A-8E are respectively a top plan view, a side sectional, elevational view, a bottom plan view, a second sectional, elevational view and a third sectional, elevational view of a single piece magnetic ferrite faceplate structure used in the method of the present invention.
Figure 8B:
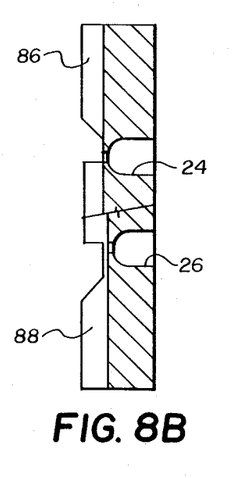
Figure 8C:
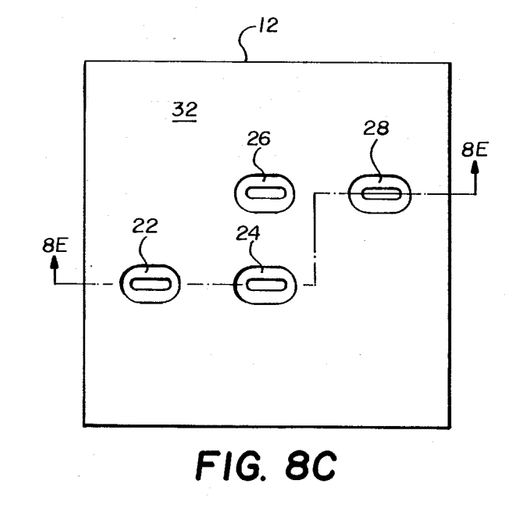
Figure 8D:
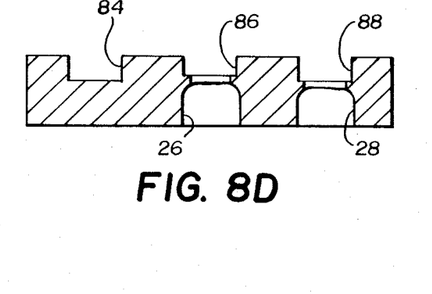
Figure 8E:
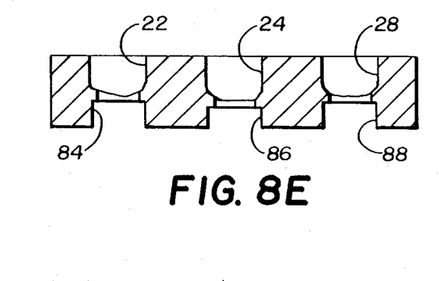
Figure 9A:
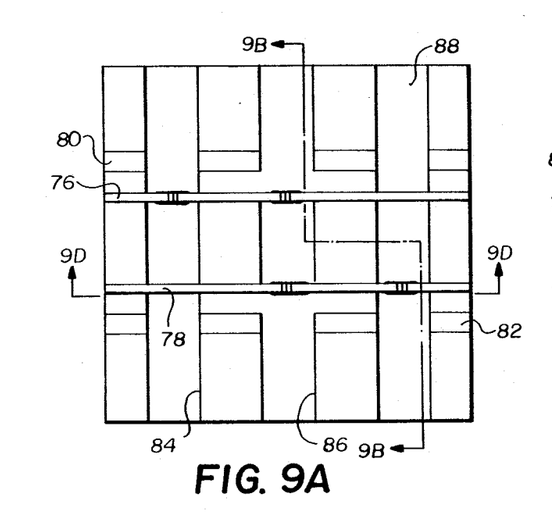
FIGS. 9A-9D are respectively a top plan view, a side elevational sectional view, a bottom plan view and another side sectional, elevational view of the faceplate of FIGS. 8A-8E in which are positioned two breadslice magnetic head core structures shown in FIG. 7.
Figure 9B:
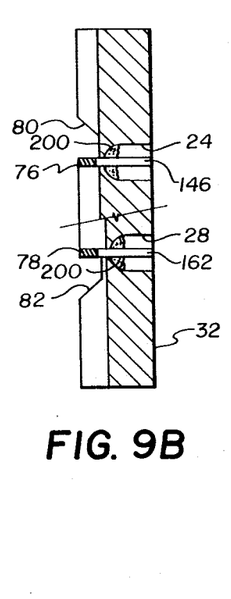
Figure 9C:
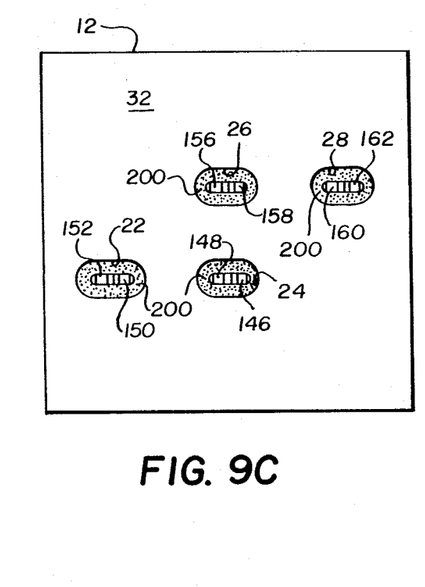
Figure 9D:
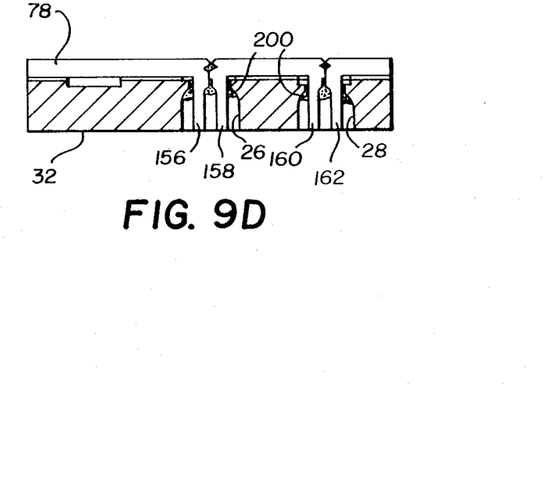

As shown in FIG. 6, the structure of FIG. 5 is sliced to produce a plurality of magnetic ferrite breadslice core structures, such as breadslices 76 and 78. As shown in FIG. 7, bread slide 76 includes an elongated base portion 144 and magnetic head core elements 146, 148, 150 and 152. Similarly, breadslice 78 includes a base portion 154 and magnetic head core elements 156, 158, and 160, 162.

Referring now to FIGS. 8A-8E, there is shown magnetic ferrite faceplate structure 12 after steps G, H, and I of FIG. 2 have been completed. As shown, faceplate structure 12 includes an upper face having a plurality of longitudinal slots 80 and 82, and transverse slots 84, 86, and 88 which intersect slots 80 and 82. Faceplate 12 also includes slots 22, 24, 26 and 28 which extend through the thickness of faceplate 12 and which have narrow cross sectional areas at the slotted face 30 and broader cross sectional areas below face 30.

As shown in FIGS. 9A-9D, magnetic ferrite breadslice core structures 76 and 78 are positioned flush against the inner walls of slots 80 and 82 to establish accurate intertrack spacing between the heads formed from breadslices 76 and 78. Core elements 160 and 162 extend through slot 78, core elements 156 and 158 extend through slot 26. Core elements 148 and 146 extend through slot 24 and core elements 152 and 150 extend through slot 22. The rear surfaces of core elements 146-158 are preferably substantially coplanar with face 32 of faceplate 12.

Breadslices 76 and 78 are bonded to faceplate 12 by means of non-magnetic material (such as glass) which fills the space between the core elements of the breadslices and the slots in which they are positioned. Thus, non-magnetic material 200 bonds breadslices 76, 78 to faceplate 12.

Figure 10A:
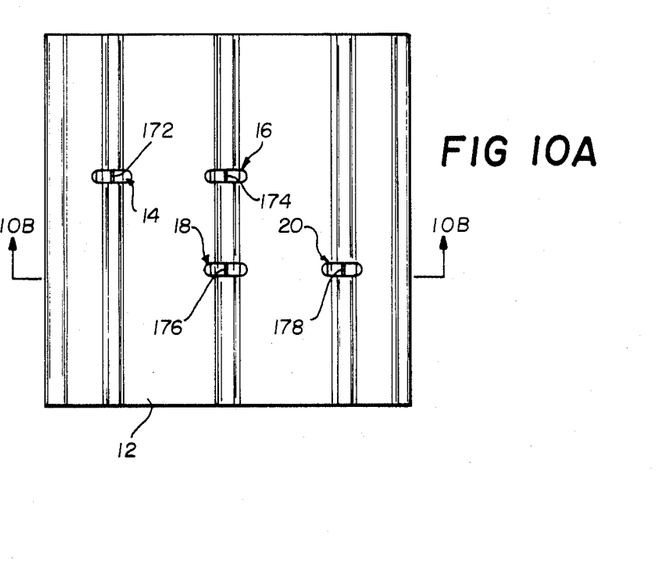
FIGS. 10A and 10B are respectively a top plan view and a side sectional, elevational view of a finished magnetic head assembly with the excess magnetic ferrite ground away from the breadslice structures and the magnetic ferrite faceplate structure.
Figure 10B:
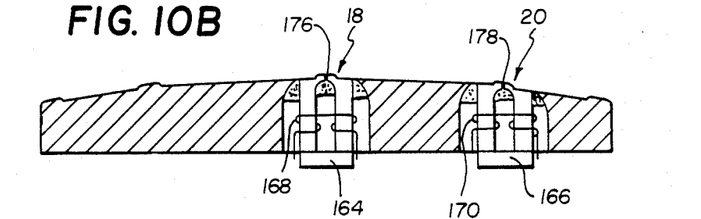

Referring now to FIGS. 10A and 10B, there is shown a finished magnetic head assembly in which portions of faceplate 12 and breadslices 76 and 78 have been removed (by grinding or the like). Magnetic heads 14, 16, 18 and 20 have tips with head gaps which are flush with face 30 of faceplate 12. As shown in FIG. 10B, magnetic ferrite back bars 164 and 166 are bonded to the core elements of heads 18 and 20 respectively. Signal coils 168 and 170 are also placed on the core elements of heads 18 and 20.

Figure 13:
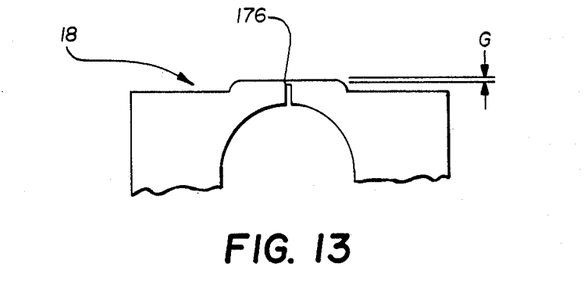
FIG. 13 is an enlarged view of a magnetic head tip.

It will be seen that the method of the present invention makes a magnetic head assembly in which multiple heads (such as heads 14 and 16, FIG. 10A) within a track have gaps (such as 172 and 174) which are parallel to exacting in-track azimuth specifications, since the heads 14 and 16 were formed from a single breadslice. Similarly, magnetic gap 176 of head 18 and magnetic gap 178 of head 20 meet the same exacting azimuth specifications since heads 18 and 20 were formed from the same breadslice. Moreover, by carefully controlling the dimensions (1) of ths slots formed on the surface of faceplate 12 (2) of the slots which extend through faceplate 12, exact parallelity between adjacent tracks is effected. Moreover, the head gaps of heads 16 and 18 are aligned along the same axis to satisfy tight azimuth deviation specifications. As shown in FIG. 13, the gap depth "G" of the magnetic gap of each head (such as head 18) is held to close tolerances to effect performance uniformity between the heads within the magnetic head assembly.

Figure 11A:
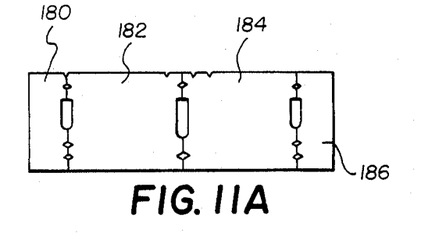
Figure 11B:
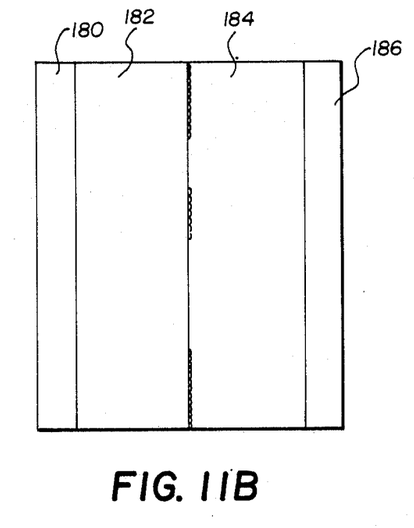
Figure 12A:
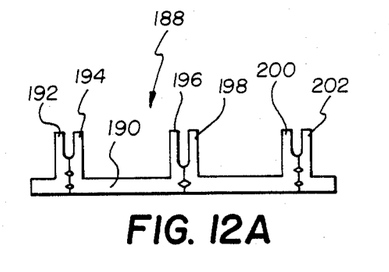
Figure 12B:
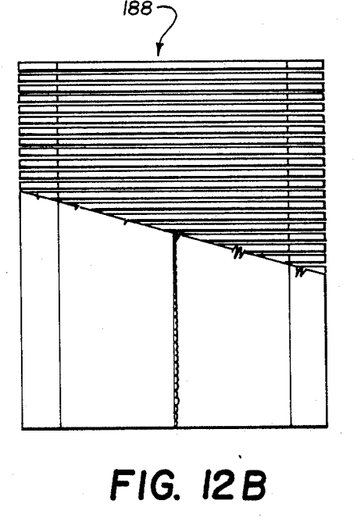

Referring to FIGS. 11A, 11B and 12A and 12B, there is shown another embodiment of the present invention for the making of breadslices having three magnetic heads. As shown in FIGS. 11A and 11B, magnetic ferrite bars 180, 182, 184 and 186 are contoured and bonded together to form a unitary structure. As shown in FIGS. 12A and 12B the unitary structure of FIG. 11B is ground away and magnetic ferrite breadslices sliced therefrom to produce three head, breadslices such as 188. Breadslice 188 includes an elongated base portion 190 and magnetic head core pairs 192, 194; 196, 198; and 200, 202. Such breadslices are then bonded in a suitable magnetic ferrite faceplate (not shown) and ground down to produce a magnetic head assembly in which each track has three magnetic heads with parallel head gaps.

It will be appreciated that the method of the present invention may be used to make magnetic head assemblies (1) having any number of heads within a track (by appropriately varying the number of head cores in a breadslice) and (2) having any number of parallel tracks (by varying the number and location of the slots fomed in the single piece magnetic ferrite faceplate structure). Moreover, the method of the invention described above may be varied so that the slots are formed in the magnetic ferrite faceplate during a molding step, thus eliminating steps (such as H and I of FIG. 2) which form slots in a blank magnetic ferrite faceplate structure.

The invention has been described in detail with particular reference to preferred embodiments thereof, but it will be understood that variations and modifications can be effected within the spirit and scope of the invention.

What is claimed is:

1. A method for making a multihead magnetic head assembly, comprising the steps of:
   providing a single piece magnetic ferrite faceplate, (1) which has a face region, and (2) which has at least two aligned slots which open on said face region and which extend into said faceplate;
   providing a multi-head magnetic ferrite "breadslice" core structure which includes an elongated base portion connecting at least two in-line magnetic heads which extend from said base portion;
   bonding said magnetic ferrite breadslice core structure to said single piece magnetic ferrite face plate so that said magnetic heads extend into said slots; and
   removing said base portion from said breadslice core structure so that individual magnetic heads remain bonded in their respective slots in said single piece magnetic ferrite faceplate.

2. The method of claim 1, wherein said step of providing a faceplate includes the step (1) of providing a magnetic ferrite faceplate blank structure and (2) of forming said slots in said faceplate blank structure.

3. The method of claim 1 wherein said step of providing a faceplate includes the steps of molding a magnetic ferrite faceplate having slots molded into the faceplate.

4. The method of claim 1 wherein said step of providing a "breadslice" core structure includes the steps of (a) forming at least three magnetic ferrite bars to predetermined dimensions; (b) contouring opposing faces of said bars to produce head gap surfaces which are lapped to a high degree of parallelity; (c) forming a layer of non-magnetic material on said head gap surfaces to a desired head gap length; (d) bonding the magnetic ferrite bars to form a unified structure, (e) removing magnetic ferrite from said unified structure to form a structure having an elongated flat base portion and at least two pairs of walls extending from the base portion; and (f) slicing individual breadslice core structures from the structure formed by step (e) wherein each breadslice core structure includes an elongated base portion connecting at least two, in-line magnetic heads which extend from said base portion.

* * * * *

UNITED STATES PATENT AND TRADEMARK OFFICE
Certificate

Patent No. 4,825,532                                                                      Patented: May 2, 1989

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is:
John D. Ricards and Richard K. Milo Signed and Sealed this Sixth Day of February, 1990.

HOWARD N. GOLDBERG

*Supervisory Patent Examiner*
*Art Unit 326*